(12) United States Patent
Kottre (10) Patent No.: US 11,352,948 B2
(45) Date of Patent: Jun. 7, 2022

(54) APPARATUS AND METHOD FOR ADJUSTING THE LENGTH OF A CONNECTING ROD OF A CYLINDER OF AN INTERNAL COMBUSTION ENGINE

(71) Applicant: MAN Energy Solutions SE, Augsburg (DE)

(72) Inventor: Ewald Kottre, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 17/279,163

(22) PCT Filed: Sep. 18, 2019

(86) PCT No.: PCT/EP2019/074926
§ 371 (c)(1),
(2) Date: Mar. 24, 2021

(87) PCT Pub. No.: WO2020/069864
PCT Pub. Date: Apr. 9, 2020

(65) Prior Publication Data
US 2021/0388759 A1    Dec. 16, 2021

(30) Foreign Application Priority Data
Sep. 25, 2018 (DE) .................... 10 2018 123 500.3

(51) Int. Cl.
*F02B 75/04* (2006.01)
*F02B 75/32* (2006.01)
*F16C 7/06* (2006.01)

(52) U.S. Cl.
CPC ............ *F02B 75/045* (2013.01); *F02B 75/32* (2013.01); *F16C 7/06* (2013.01); *F16C 2360/22* (2013.01)

(58) Field of Classification Search
CPC ..... F02B 75/045; F02B 75/32; F16C 2360/22; F16C 7/06
See application file for complete search history.

(56) References Cited

U.S. PATENT DOCUMENTS

| 3,903,753 A | 9/1975 | Ottl et al. |
| 5,020,841 A | 6/1991 | Cardine |
| (Continued) | | |

FOREIGN PATENT DOCUMENTS

| CN | 101333964 | 12/2008 |
| CN | 102319785 | 1/2012 |
| (Continued) | | |

OTHER PUBLICATIONS

Search Report dated Jun. 26, 2019 issued in German Patent Application No. 102018123500.3.
(Continued)

*Primary Examiner* — George C Jin
*Assistant Examiner* — Teuta B Holbrook
(74) *Attorney, Agent, or Firm* — Cozen O'Connor (57) ABSTRACT

An apparatus for adjusting a length of a connecting rod of a cylinder of an internal combustion engine by installing and/or removing an intermediate plate between a connecting rod small end and a connecting rod shank of the connecting rod in the state of the connecting rod, with the following assemblies: a pivot guard for the connecting rod small end mountable to the connecting rod small end between the connecting rod small end and a cylinder liner of the cylinder; supports mountable to counterweights of the cylinder on opposite sides of the connecting rod; holders mountable to the supports and extend between the supports perpendicularly to the same; lifting cylinders mountable to the holders and lift the connecting rod small end relative to the connecting rod shank with unscrewed screw connections (Continued)

between connecting rod small end and connecting rod shank.

9 Claims, 5 Drawing Sheets

(56) References Cited

U.S. PATENT DOCUMENTS

| | | | |
|---|---|---|---|
| 6,568,357 B1 * | 5/2003 | Rao | F02B 75/045 |
| | | | 123/48 B |
| 2002/0129778 A1 * | 9/2002 | Bartsch | F16C 7/06 |
| | | | 123/78 E |
| 2016/0237889 A1 | 8/2016 | Melde-Tuczai et al. | |

FOREIGN PATENT DOCUMENTS

| | | |
|---|---|---|
| CN | 206592421 U | 10/2017 |
| DE | 641846 | 2/1937 |
| DE | 3516506 | 11/1986 |
| DE | 10046214 C1 | 4/2002 |
| DE | 102013109730 | 3/2014 |
| EP | 0297903 A2 | 1/1989 |
| EP | 1085184 A2 | 3/2001 |
| ES | 2229824 T3 | 4/2005 |
| GB | 210863 | 2/1924 |
| GB | 1411527 | 10/1975 |
| WO | WO 2014/062068 | 4/2014 |
| WO | WO 2016/203043 | 12/2016 |

OTHER PUBLICATIONS

Office Action dated Jan. 5, 2022 issued in Chinese Patent Application No. 201980062916.0.

Xiongjian et al., "Commercial Vehicles: Brief Comment on Domestic Heavy Trucks of 2012 Beijing International Auto Show," Jun. 4, 2012.

* cited by examiner

APPARATUS AND METHOD FOR ADJUSTING THE LENGTH OF A CONNECTING ROD OF A CYLINDER OF AN INTERNAL COMBUSTION ENGINE

CROSS REFERENCE TO RELATED APPLICATIONS

This is a U.S. national stage of Application No. PCT/EP2019/074926 filed Sep. 18, 2019. Priority is claimed on German Application No. DE 10 2018 123 500.3 filed Sep. 25, 2018 the content of which is incorporated herein by reference.

BACKGROUND OF THE INVENTION

1. Field of the Invention

The disclosure relates to an apparatus and to a method for adjusting a length of a connecting rod of a cylinder of an internal combustion engine.

2. Description of Related Art

An internal combustion engine, such as for example a diesel internal combustion engine of a ship, comprises multiple cylinders. Each cylinder of an internal combustion engine comprises a piston that is moveably guided up and down in a cylinder liner. The piston is coupled via a connecting rod to a crankshaft of the internal combustion engine, wherein it is already known from practice that a connecting rod is composed of a connecting rod small end and a connecting rod shank, which are fastened to one another via screw connections. A small end bearing eye serves for connecting the connecting rod to the piston and a big end bearing eye for connecting the connecting rod to the crankshaft.

To adjust a so-called compression ratio on an internal combustion engine it is known from practice to replace the piston head for example with a piston head having a deviating trough geometry. It is likewise known from practice to change the length of the connecting rod of a cylinder for adjusting the compression ratio, namely by installing and/or removing an intermediate plate between the connecting rod small end and the connecting rod shank. According to the practice, the cylinder has to be disassembled for replacing the piston head and also for replacing or installing or removing an intermediate plate. It is required, in particular, to disassemble the connecting rod. This is very time consuming.

SUMMARY OF THE INVENTION

There is a need for adjusting or changing the length of a connecting rod more easily to adjust the compression ratio of a respective cylinder.

One aspect of the invention is a new type of apparatus and a corresponding method for adjusting the length of the connecting rod of a cylinder of the internal combustion engine by installing and/or removing an intermediate plate between connecting rod small end and connecting rod shank of the connecting rod.

One aspect of the invention is an apparatus for adjusting the length of a connecting rod of a cylinder of an internal combustion engine.

One aspect of the invention provides an apparatus for adjusting the length of a connecting rod of a cylinder of an internal combustion engine, namely by installing and/or removing an intermediate plate between a connecting rod small end and a connecting rod shank of the connecting rod in the state of the connecting rod as installed in the internal combustion engine, with at least the following assemblies: a pivot guard for the connecting rod small end, which is mountable to the connecting rod small end between the connecting rod small end and a cylinder liner of the cylinder. Supports which, on opposite sides of the connecting rod, are mountable to counterweights of the cylinder. Holders, which are mountable to the supports and extend between the supports perpendicularly to the same. Lifting cylinders which, with unscrewed screw connections, are mountable to the holders and serve for lifting the connecting rod small end relative to the connecting rod shank between connecting rod small end and connecting rod shanks. At least one of the supports comprises a fixing frame, via which the connecting rod shank is fixable to the respective support.

The apparatus according to one aspect of the invention allows installing and/or removing intermediate plates in the state of the connecting rod as installed in an internal combustion engine. By way of this, the effort during the adjustment of the length of the connecting rod compared with the practice can be significantly reduced. Preferentially, the apparatus comprises props which, following the lifting of the connecting rod small end relative to the connecting rod shank, are mountable to the connecting rod small end as protective elements. By way of the props, a safety function can be realised. There is no risk that in particular when the lifting cylinders unexpectedly lower the connecting rod small end, a person working on the internal combustion engine suffers an injury. The props suitably prop up the connecting rod small end.

The method for adjusting the length of a connecting rod of a cylinder of an internal combustion engine.

The method comprises at least the following steps: transferring a piston of the cylinder into a defined position. Unscrewing and removing the screw connections between connecting rod small end and connecting rod shank. Mounting the pivot guard to the connecting rod small end. Mounting the supports to the counterweights of the cylinder. Mounting the holders to the supports. Mounting the lifting cylinders to the holders. Lifting the connecting rod small end relative to the connecting rod shank via the lifting cylinders. Installing and/or removing the intermediate plate. Lowering the connecting rod small end relative to the connecting rod shank via the lifting cylinders. Disassembling the lifting cylinders, the holders, the supports and the pivot guard. Adding and tightening the screw connections between connecting rod small end and connecting rod shank. With these method steps, an intermediate plate between connecting rod small end and connecting rod shank can be installed and/or removed in the internal combustion engine with the connecting rod in the installed state.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

One aspect of the invention relates to an apparatus and to a method for adjusting the length of a connecting rod of a cylinder of an internal combustion engine.

Figure 1:
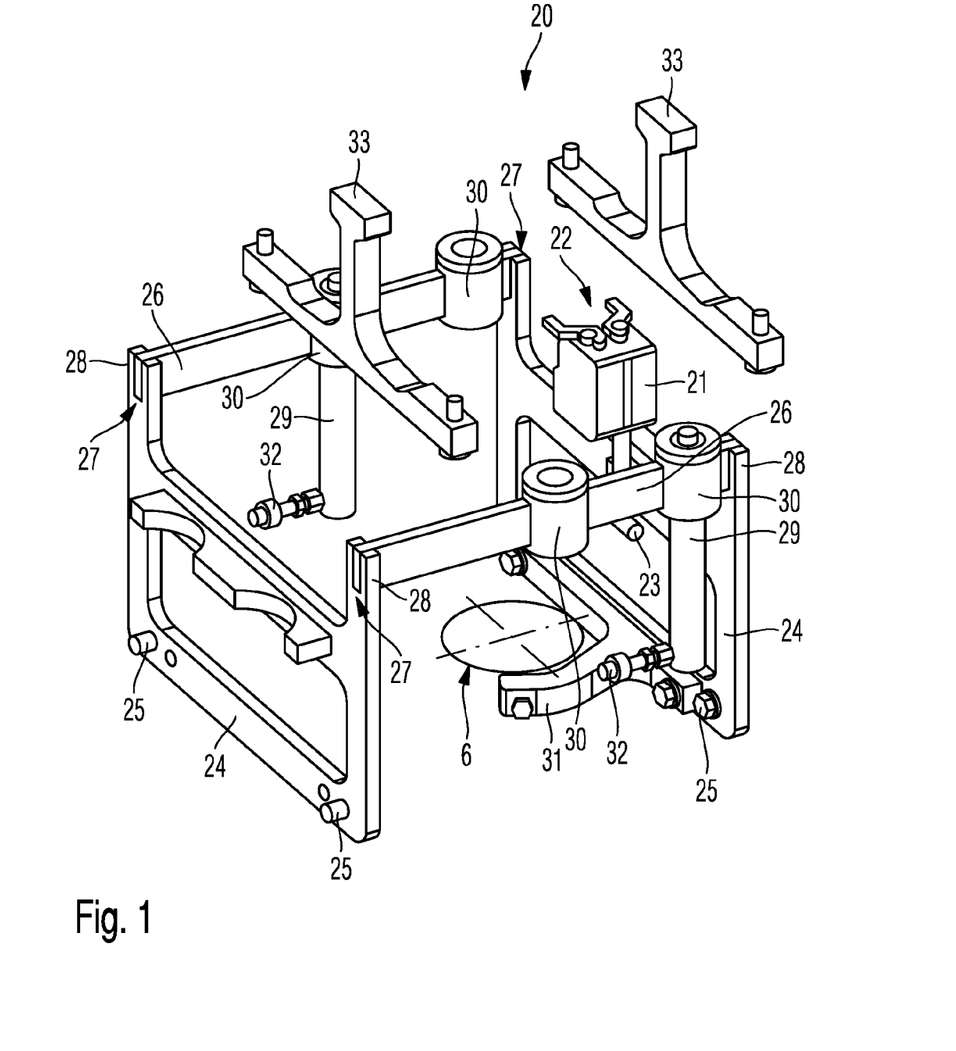
FIG. 1 is a perspective view of an apparatus for adjusting a length of a connecting rod of a cylinder of an internal combustion engine.
Figure 2:
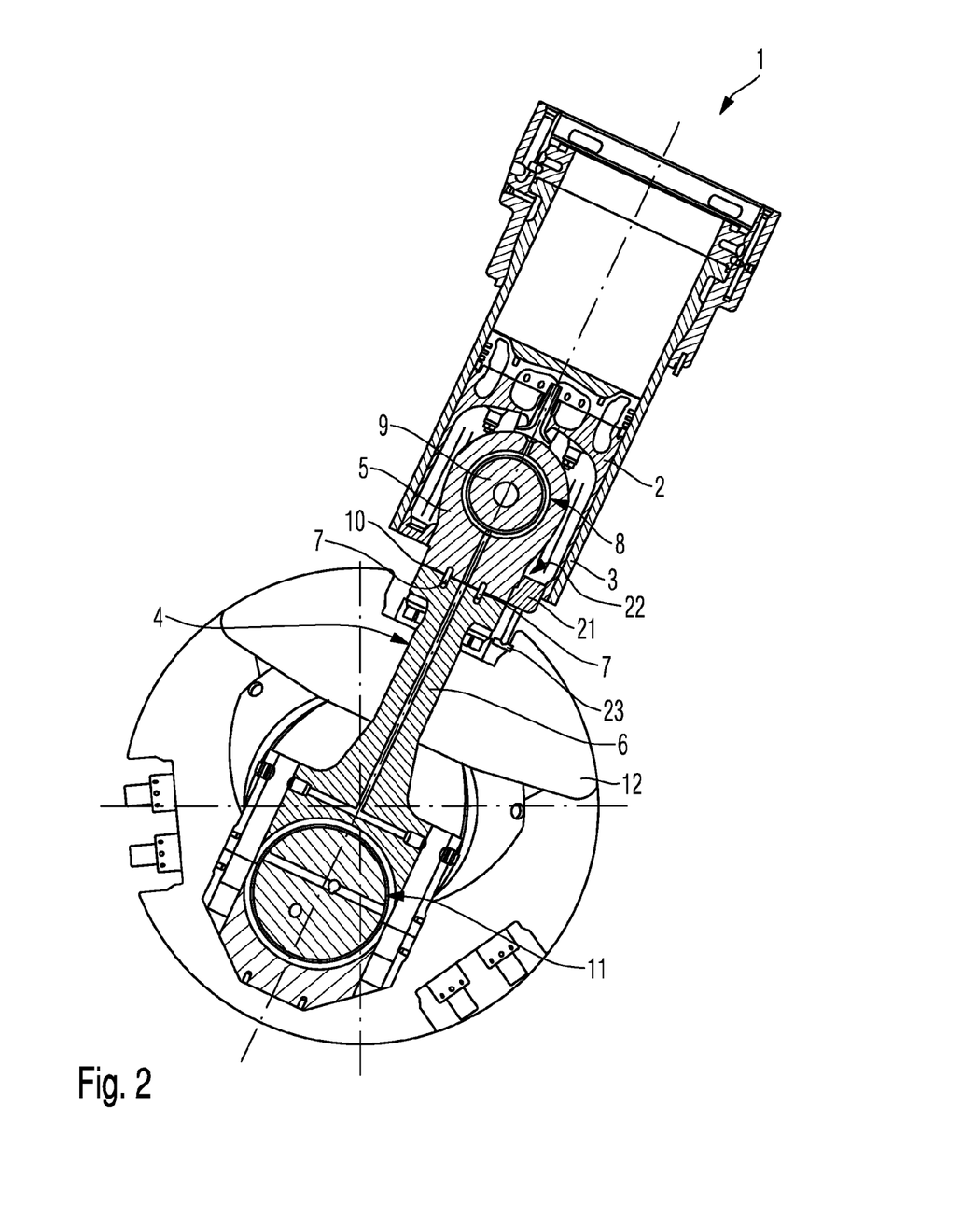
FIG. 2 is a cylinder of an internal combustion engine together with an assembly of the apparatus for illustrating a method for adjusting the length of the connecting rod of the cylinder of an internal combustion engine.
Figure 3:
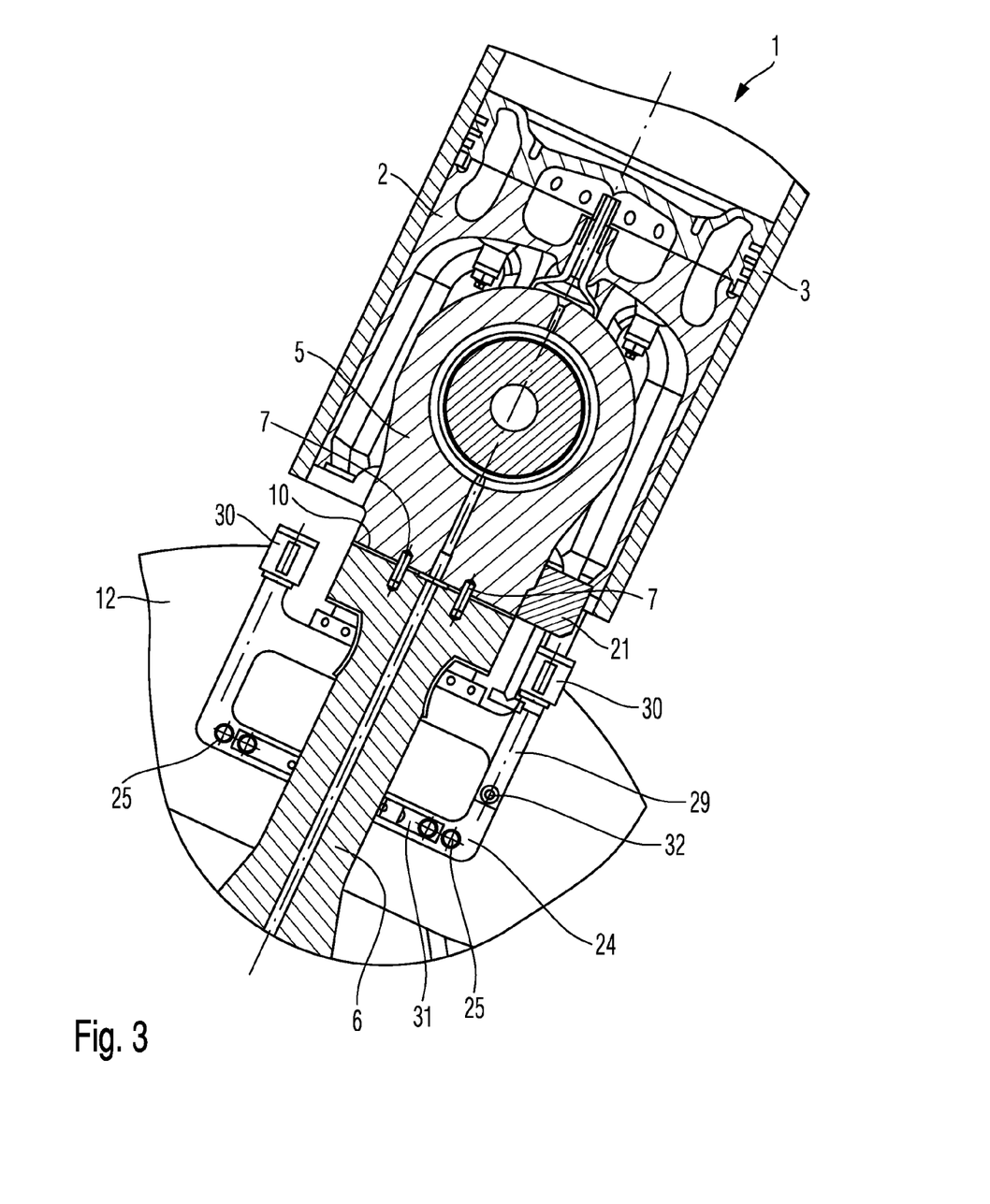
FIG. 3 is an extract from the cylinder of the figure with further assemblies of the apparatus for adjusting the length of a connecting rod of a cylinder of an internal combustion engine.

FIG. 1 shows a perspective view of an apparatus 20 according to one aspect of the invention, which serves for installing and/or removing an intermediate plate between a connecting rod small end and a connecting rod shank of a connecting rod of a cylinder of the internal combustion engine, namely in the state of the connecting rod as installed in the internal combustion engine, so that it is not necessary to remove the connecting rod from the internal combustion engine.

FIGS. 2 to 5 show the apparatus 20 according to one aspect of the invention employed in the region of a cylinder 1 of the internal combustion engine. The cylinder 1 comprises a piston 2, which is moveably guided up and down in a cylinder liner 3. Furthermore, the cylinder 1 comprises a connecting rod 4, which is composed of a connecting rod small end 5 and a connecting rod shank 6, wherein the connecting rod small end 5 and the connecting rod shank 6 are centred via centring devices 7 and in the centred state are screwed to one another via screw connections which are not shown. A small end bearing eye 8 of the connecting rod 4 through which a piston pin 9 extends serves for connecting the connecting rod 4 to the piston 2. A big end bearing eye 11 of the connecting rod 4 serves for connecting the connecting rod 4 to a crankshaft.

Between the connecting rod small end 5 and the connecting rod shank 6 of the connecting rod 4 an intermediate plate 10 with a defined thickness can be inserted in order to thereby adjust the length of the connecting rod 4 and thereby ultimately influence a compression ratio of the cylinder 1.

The apparatus 20 according to one aspect of the invention of FIG. 1 serves for installing and/or removing such an intermediate plate 10 in the state of the connecting rod 4 as installed in the internal combustion engine.

The apparatus 20 according to one aspect of the invention comprises a pivot guard 21 for the connecting rod small end 5 of the connecting rod 4, which is mountable to the connecting rod small end 5, namely between the connecting rod small end 5 and the cylinder liner 3 of the piston 2. The pivot guard 21 comprises a fastening mechanism 22 preferentially designed as a latch, via which the pivot guard 21 can be mounted to the connecting rod small end 5 of the connecting rod 4. This fastening mechanism 22 can be actuated, namely opened and closed via an actuating mechanism 23 of the pivot guard 21.

Furthermore, the apparatus 20 according to one aspect of the invention comprises supports 24. On a side of the connecting rod 4, each of the supports 24 is mountable to a corresponding counterweight 12 of the respective cylinder 1, so that a support 24 each is mounted to a counterweight of the cylinder 1 on two sides of the cylinder 1 located opposite one another. FIG. 1 shows corresponding mounting screws 25 for mounting the supports 24 to the counterweights 12 of the cylinder 1.

The apparatus 20 according to the invention, furthermore, comprises holders 26. The holders 26 are mountable to the supports 24 and extend perpendicularly to the supports 24.

From FIG. 1 it is evident that the holders 26 are introducible into slots 27 of the supports 24, which are formed on protrusions 28 of the supports, wherein these protrusions 28 are located opposite those portions of the supports through which the mounting screws 25 extend for mounting the supports 24 to the counterweights 12 of the cylinder 1.

In addition to this, the apparatus 20 according to the invention comprises lifting cylinders 29. Lifting cylinders 29 are mountable to the holders 26 and serve for lifting the connecting rod small end 5 of the connecting rod 4 relative to the connecting rod shank 6 of the connecting rod 4 with unscrewed screw connections between connecting rod small end 5 and connecting rod shank 6.

As is evident from FIG. 1, each of the holders 26 comprises at least two mounting positions 30 for the lifting cylinders 29, wherein in the region of each holder 26 a lifting cylinder 29 each will be or is arranged in one of the mounting positions 30.

In the exemplary embodiment shown in FIG. 1, one of the supports 24, which is mounted to one of the counterweights 12 of the cylinder 1, comprises a fixing frame 31, via which the connecting rod shank 6 of the connecting rod 4 is fixable to the respective support 24.

Accordingly, each of the two supports 24 is mounted to a counterweight 12. One of the supports 24 fixes the connecting rod shank 6 of the connecting rod 4 and supports itself on the same. The holders 26 are mounted to the supports 24. The holders 26 receive the lifting cylinders 29. In particular when the screw connections between connecting rod small end 5 and connecting rod shank 6 are unscrewed, the lifting cylinders 29 can lift the connecting rod small end 5 relative to the connecting rod shank 6, while a tilting of the connecting rod shank 6 and a tilting of the connecting rod small end 5 are prevented via the fixing frame 31 and the pivot guard 21 respectively.

Figure 5:
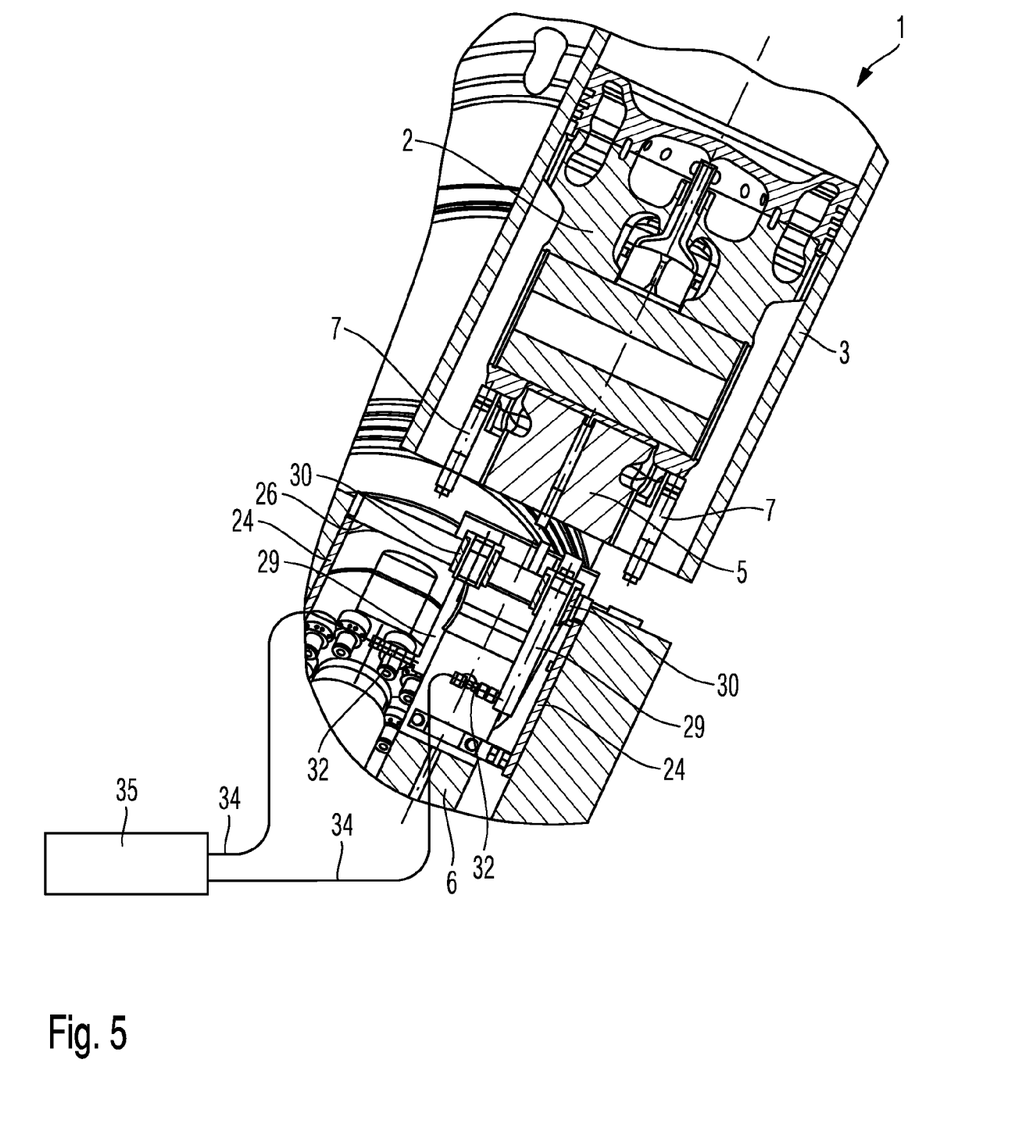
FIG. 5 is a cross section V-V of FIG. 4.

The lifting cylinders 29 are preferentially pressure medium-actuated cylinders, such as for example hydraulic cylinders. FIG. 1 shows corresponding pressure medium connections 32 for supplying the lifting cylinders 29 with a pressure medium. FIG. 5 shows pressure medium lines 34 and a pressure medium pump 35. Starting out from the pressure medium pump 35, the lifting cylinders 29 can be supplied with pressure medium via the pressure medium lines 34 and pressure medium connections 32.

In the shown preferred exemplary embodiment, the apparatus 20 according to the invention furthermore comprises props 33. Following the lifting of the connecting rod small end 5 relative to the connecting rod shank 6, the props 33 are mountable to the connecting rod small end 5 as protective element in order to prevent, in particular when the lifting cylinders 29 should unintentionally fail, an uncontrolled downward moving of the connecting rod small end 5 in the direction of the connecting rod shank 6 and thereby protect persons working on the internal combustion engine from a risk of injury.

To install and/or remove an intermediate plate 10 between the connecting rod small end 5 and the connecting rod shank 6 of the connecting rod 4 in the state of the connecting rod 4 as installed in the internal combustion engine, the following procedure is followed using the apparatus 20 described above:

Initially, in an act a), the piston 2 of the cylinder 1, on/from which the intermediate plate 10 is to be installed and/or removed, is transferred into a defined position, preferentially into the bottom dead centre. See FIG. 2.

Following this, screw connections between connecting rod small end 5 and connecting rod shank 6 are unscrewed and removed in an act b).

Following this, the pivot guard 21 is mounted to the connecting rod small end 5 in an act c), preferentially in that the fastening mechanism 22, configured as a latch latches or engages into a corresponding contour on the connecting rod small end 5. See FIG. 2.

In the following, the supports 24 of the apparatus 20 are mounted in an act d) to the counterweights 12 of the respective cylinder 1, namely via the mounting screws 25. See FIG. 3.

Following this, the holders 26 are mounted to the supports 24 in an act e), wherein in a following act f) the lifting cylinders 30 are mounted to the holders 26. See FIG. 3.

Following this, the connecting rod small end 5 can be lifted in an act g) relative to the connecting rod shank 6 of the connecting rod 4. See FIG. 4, 5.

Figure 4:
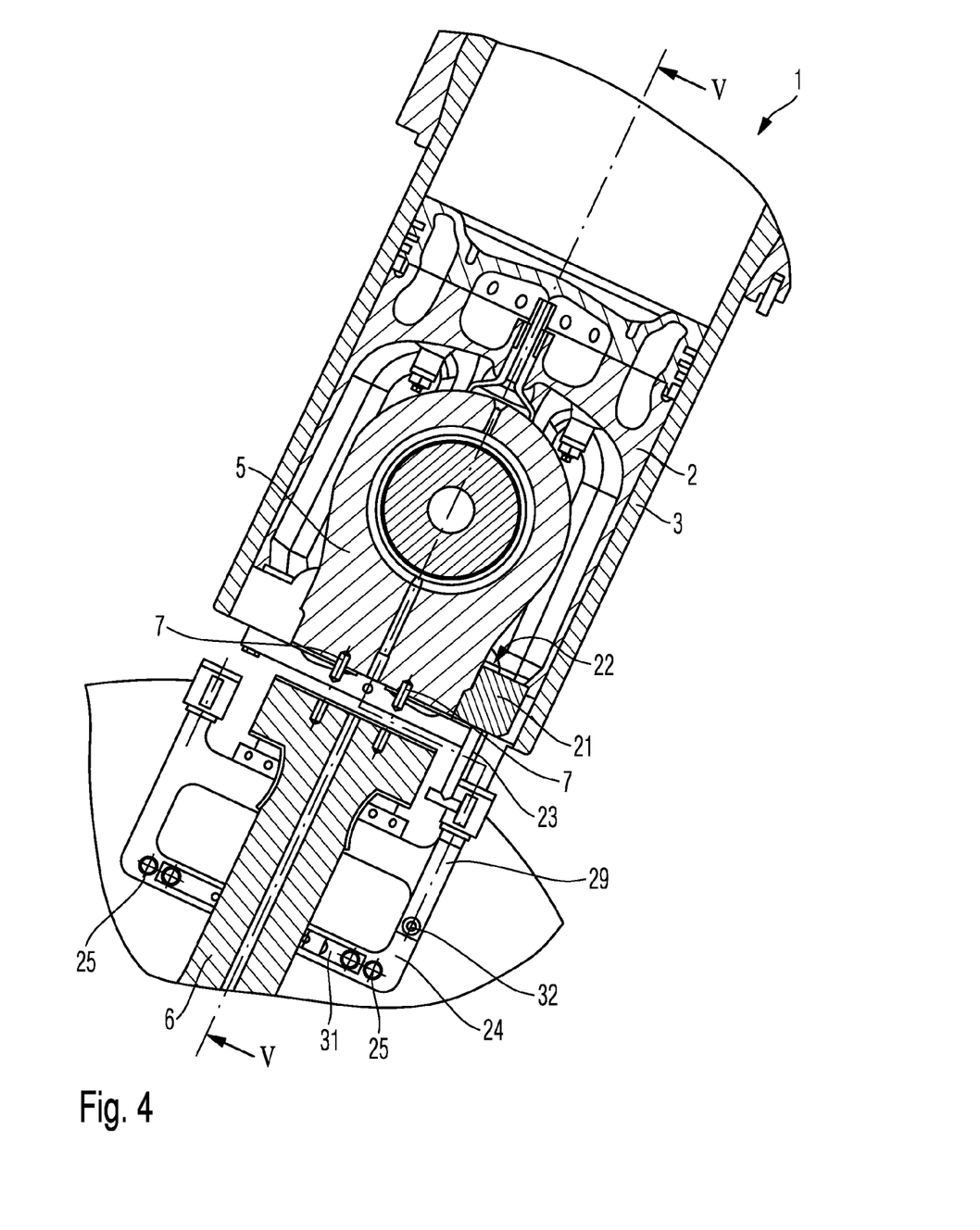
FIG. 4 is an extract of FIG. 5 in a second state.

Preferentially, the props 33 in the lifted state are mounted to the connecting rod small end 5 and subsequently the connecting rod small end 5 lowered again, wherein the connecting rod small end 5 then supports itself on the connecting rod shank 6 via the props 33. A defined gap between connecting rod small end 5 and connecting rod shank 6 is then formed, which allows access to the intermediate plate 10.

This is followed in an act h) by the removing and/or installing of the intermediate plate 10. It is possible to exchange an intermediate plate 10 with a first thickness with an intermediate plate 10 with a second thickness in order to thereby adjust the length of the connecting rod 4.

Following the installing and/or removing of the intermediate plate 10, the connecting rod small end 5 can be lifted relative to the connecting rod shank 6 in order to disassemble the holders 26.

In each case, the lowering of the connecting rod small end 5 relative to the connecting rod shank 6 via the lifting cylinders 29 takes place in each case in an act i) after the installing and removing of the intermediate plate 10, wherein in particular when the connecting rod small end 5, if applicable with the intermediate arrangement of the intermediate plate 10, supports itself on the connecting rod shank 6, in an act j), lifting cylinders 29, holders 26 and supports 24 as well as pivot guard 21 are disassembled in order to subsequently add and tighten screw connections between connecting rod small end 5 and connecting rod shank 6 in an act k).

One aspect of the invention allows a simple and time-saving installation and removal of intermediate plates 10 between a connecting rod small end 5 and a connecting rod shank 6 of a connecting rod 4 for changing the length of the connecting rod 4, in order to thereby suitably adjust in particular the compression ratio of the cylinder 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus that adjusts a length of a connecting rod of a cylinder of an internal combustion engine by installing and/or removing an intermediate plate between a connecting rod small end and a connecting rod shank of the connecting rod in a state of the connecting rod as installed in the internal combustion engine, comprising:
    a pivot guard for the connecting rod small end, which is mountable to the connecting rod small end between the connecting rod small end and a cylinder liner of the cylinder;
    a plurality of supports, which, on opposite sides of the connecting rod, are mountable to counterweights of the cylinder;
    holders, which are mountable to the supports and extend between the supports perpendicularly to the same; and
    lifting cylinders, which are mountable to the holders and configured to lift the connecting rod small end relative to the connecting rod shank with unscrewed screw connections between connecting rod small end and the connecting rod shank.

2. The apparatus according to claim 1, wherein at least one of the plurality of supports comprises a fixing frame, via which the connecting rod shank is fixable to the respective support.

3. The apparatus according to claim 1, wherein each holder comprises at least two mounting positions for the lifting cylinders.

4. The apparatus according to claim 1, wherein the lifting cylinders are hydraulic cylinders.

5. The apparatus according to claim 1, further comprising: props, which following the lifting of the connecting rod small end relative to the connecting rod shank, are mountable to the connecting rod small end as predictive elements.

6. A method for adjusting a length of a connecting rod of a cylinder of an internal combustion engine, by installing and/or removing an intermediate plate between a connecting rod small end and a connecting rod shank of the connecting rod in a state of the connecting rod as installed in the internal combustion engine using an apparatus having a pivot guard for the connecting rod small end, which is mountable to the connecting rod small end between the connecting rod small end and a cylinder liner of the cylinder, a plurality of supports, which, on opposite sides of the connecting rod, are mountable to counterweights of the cylinder, holders, which are mountable to the supports and extend between the supports perpendicularly to the same, and lifting cylinders, which are mountable to the holders and configured to lift the connecting rod small end relative to the connecting rod shank with unscrewed screw connections between connecting rod small end and the connecting rod shank, comprising:
    transferring a piston of the cylinder into a defined position;
    unscrewing and removing the screw connections between connecting rod small end and connecting rod shank;
    mounting the pivot guard to the connecting rod small end;
    mounting the supports to the counterweights of the cylinder;
    mounting the holders to the supports;

mounting the lifting cylinders to the holders;
lifting the connecting rod small end relative to the connecting rod shank via the lifting cylinders;
installing and/or removing the intermediate plate;
lowering the connecting rod small end relative to the connecting rod shank via the lifting cylinders;
disassembling the lifting cylinders, the holders, the supports, and the pivot guard; and
adding and tightening the screw connections between connecting rod small end and connecting rod shank.

7. The method according to claim 6, wherein the a defined position is a bottom dead centre.

8. The method according to claim 6, further comprising, after the lifting the connecting rod small end: mounting props; and lowering the connecting rod small end relative to the connecting rod shank until the connecting rod small end is propped up via the props.

9. The method according to claim 8, further comprising, after the installing and/or the removing of the intermediate plate: lifting the connecting rod small end relative to the connecting rod shank; and disassembling the props.

* * * * *